US006774601B2

(12) United States Patent
Schwartz et al.

(10) Patent No.: US 6,774,601 B2
(45) Date of Patent: Aug. 10, 2004

(54) SYSTEM AND METHOD FOR PREDICTING MECHANICAL FAILURES IN MACHINERY DRIVEN BY AN INDUCTION MOTOR

(75) Inventors: Elia Schwartz, Nesher (IL); Mila Gorodetski, Nesher (IL)

(73) Assignee: Predictive Systems Engineering, Ltd., Nesher (IL)

( * ) Notice: Subject to any disclaimer, the term of this patent is extended or adjusted under 35 U.S.C. 154(b) by 12 days.

(21) Appl. No.: 10/166,903

(22) Filed: Jun. 11, 2002

(65) Prior Publication Data

US 2003/0042861 A1 Mar. 6, 2003

Related U.S. Application Data

(60) Provisional application No. 60/297,380, filed on Jun. 11, 2001.

(51) Int. Cl.[7] .................................................. H02P 7/36
(52) U.S. Cl. .................. 318/727; 318/343; 318/437; 318/439
(58) Field of Search ......................... 318/727, 434, 318/437, 439, 729, 634

(56) References Cited

U.S. PATENT DOCUMENTS

| | | | | |
|---|---|---|---|---|
| 4,369,403 A | * | 1/1983 | Lee | 318/729 |
| 4,481,786 A | * | 11/1984 | Bashark | 62/160 |
| 4,717,190 A | * | 1/1988 | Witherspoon | 294/99.2 |
| 4,965,513 A | | 10/1990 | Haynes et al. | 324/158 MG |
| 5,461,329 A | | 10/1995 | Linehan et al. | 324/772 |
| 5,548,197 A | | 8/1996 | Unsworth et al. | 318/757 |
| 5,587,635 A | | 12/1996 | Watanabe et al. | 318/434 |
| 5,754,450 A | | 5/1998 | Solomon et al. | 364/551.01 |
| 6,144,924 A | | 11/2000 | Dowling et al. | 702/60 |

OTHER PUBLICATIONS

M. Daish, D. Bradley, J. Carroll, "Applying Predictive Maintenance to Power Quality," Quality and Security of Supply in Electrical Networks, Conference Proceedings 1999 (pp. 5/1.1–13).

A. Bentounsi, A. Nicolas, "On Line Diagnosis of Defaults on Squirrel Cage Motors Using FEM," IEEE Transactions on Magnetics, vol. 34, No. 5, Sep. 1998 (pp. 3511–3514).

M.A. Sanz–Bobi, M. A. Donaire, "Diagnosis of Electrical Motors Using Artificial Neural Networks," SDEMPED '99 Record. 1999 IEEE International Symposium on Diagnostics for Electrical Machines, Power Electronics and Drives 1999 (pp. 369–374).

(List continued on next page.)

Primary Examiner—Rita Leykin
(74) Attorney, Agent, or Firm—Synnestvedt & Lechner LLP

(57) ABSTRACT

A system and method for predicting mechanical failures in machinery driven by induction motors by using the motor as a diagnostic tool to detect present mechanical disturbances. The motor is monitored during operation to avoid downtime. The motor's torque fluctuations are used as an indicator of early-stage mechanical failures in the machinery. The motor's torque fluctuations are determined using indirect sensing techniques that are less expensive and less intrusive than previously known. More specifically, torque is derived from easily and inexpensively measurable parameters, such as motor slip and phase angle. Current operation is compared to known normal operation. Variations of the motor's characteristics from the known baseline indicate an actual or approaching mechanical failure. "Experimental Fractals" are disclosed that visually represent a current state of the monitored machinery and allow for visual comparison to a baseline for detection of mechanical failures. Future failures are forecasted by extrapolating a derived trend.

28 Claims, 15 Drawing Sheets

OTHER PUBLICATIONS

C. N. Obiozo, M.N.O. Sadiku, *"Finite Element Analysis of a Solid Rotor Induction Motor Under Stator Winding Effects,"* IEEE Proceedings of SOUTHEASTCON '91 (Cat. No. 91CH2998-3) 1991, vol. 1 (pp. 445-453).

Bethel, *"Correlating Dynamic and Static Motor Testing,"* Electrical Business (vol. 35, No. 4, Apr. 1999) [online], [retrieved on Jun. 28, 2001]. Retrieved from the Internet <URLhttp://www.ebmag.com/curr/articleI.phtlm?id=200 (3 pp.).

* cited by examiner

SYSTEM AND METHOD FOR PREDICTING MECHANICAL FAILURES IN MACHINERY DRIVEN BY AN INDUCTION MOTOR

CROSS-REFERENCE TO RELATED APPLICATION

This application claims the benefit under 35 U.S.C. 119(e) of U.S. Provisional Patent Application No. 60/297,380, filed Jun. 11, 2001.

FIELD OF THE INVENTION

The present invention relates generally to a method and system for predicting mechanical failures in machinery driven by an induction motor, and particularly for detecting, during machinery operation, the occurrence of minor mechanical disturbances as reflected in fluctuations of induction motor torque. This is useful for scheduling machinery down-time and/or maintenance at an early stage before the mechanical disturbances become mechanical failures rendering the machinery inoperable.

BACKGROUND OF THE INVENTION

A need exists for a cost-effective approach to predictive maintenance of electro-mechanical rotary equipment, such as pumps, compressors, mixers, mills, refrigeration equipment and the like. A significant disadvantage of traditional predictive maintenance practice is the significant cost of a monitoring system. A common method for predicting mechanical failures in motor-driven machinery is measuring and analyzing the machinery's vibration spectrum (vibration signature). This method requires continuous or periodic installation of special vibration sensors and/or signal analyzers and is therefore complicated and/or expensive. For many types of machinery, and especially for machinery operating in hazardous or relatively inaccessible environments, provision and/or monitoring of such sensors can be particularly complicated and/or expensive.

Various attempts to use the induction motor itself as a tool for diagnosis of mechanical failures, rather than such sensors, are known in the art. For example, U.S. Pat. No. 5,754,450 to Solomon, et al. discloses an apparatus for diagnosing certain faults in refrigeration or air conditioning systems by comparing the motor current in a normal operating mode to the motor current in failure mode. This and other techniques are inadequate for detecting mechanical failures such as misalignment, mechanical looseness, bearing failures and other typical mechanical failures.

U.S. Pat. No. 4,965,513 to Haynes, et al. discloses use of a motor's current signatures for the detection of abnormalities of motor driven machinery, especially motor-operated valves. The Haynes approach uses a demodulator of an analog signal of AC current. The output of the demodulator is a DC signal proportional to the RMS of the AC current. The demodulated signal is further processed by a low-pass filter, which deletes all frequencies below a main frequency of the supplied voltage (50 or 60 Hz). After the filter, the signal is passed through a Fast Fourier Transform processor. The frequency spectrum (digital signature) thus obtained reflects the condition of the machinery driven by an induction motor.

A principal disadvantage of the Haynes approach is the use of analog signal measurement facilities that are less accurate and more expensive than digital signal processing.

Another problem with the Haynes approach is the influence of fluctuations in the induction motor frequency and voltage. This introduces noise into the current signature and makes it difficult to detect minor disturbances in motor current signatures caused by mechanical disturbances in machinery driven by an induction motor. Accordingly, use of motor current signatures for detecting mechanical failures in motor-driven machinery is associated with certain inaccuracies that limit the possibility of using motor current signature analysis for detection of minor early-stage disturbances in machinery driven by an induction motor. This fact is known to those skilled in the art.

To partially overcome these limitations, U.S. Pat. No. 5,461,329 to Linehan, et al. discloses use of an adjustable frequency clock generator that adjusts its input frequency with the frequency variations of a non-stationary analog carrier wave. This method and circuitry makes a data acquisition and signal analyzing system more complicated and more expensive and fails to completely eliminate the influence of supply energy harmonics noise on a current signature.

The phase angle of a motor, in other words the angle between current and voltage zero crossings, is presently used for motor power calculations, current measurement compensation and motor performance evaluation, as disclosed, for example, in U.S. Pat. No. 6,144,924 to Dowling, et al. U.S. Pat. No. 5,548,197 to Unsworth, et al. discloses a method for using phase angle for calculation of rotation speed of an induction motor.

Prior art methods for load torque evaluation and analysis are mostly based on the direct measurement by strain gauges and other sensors. Such torque measuring sensors are usually installed on a coupling placed between the motor and driven machine shafts. It is often complicated, expensive and sometimes impossible to use such kinds of torque measuring devices.

Applicants have recognized that mechanical disturbances of machinery driven by an induction motor cause fluctuations in the motor's torque that influence easily measurable parameters of an electrical motor. Such parameters include, for example, current phase angle, motor slip, and motor torque. These motor operation parameters are widely known but have not been used for detection of mechanical failures. Applicants have recognized that, to be effective, the detection of minor mechanical disturbances based on analysis of an induction motor during operation should be based not on current analysis but on such other motor parameters, which are not influenced by voltage amplitude, frequency and high harmonics. Monitoring of such motor parameters is therefore useful for remote detection of disturbances, in and prediction of mechanical failures, in machinery driven by an induction motor.

SUMMARY OF THE INVENTION

The present invention provides a simple and inexpensive system and method for remote detection of mechanical disturbances in machinery driven by an induction motor, and for thereby predicting mechanical failures of the machinery. Conceptually, the present invention provides a method of using an induction motor as a diagnostic tool for predicting incipient failures and/or recognizing present disturbances in machinery driven by the motor.

The present invention provides for measurement of only motor torque and current, which may be measured during operation of the motor and machinery, with non-intrusive techniques using relatively inexpensive sensors, and avoiding the need for expensive and unstable A/D converters. From these measurements, motor phase angle and motor slip may be derived. Motor torque is proportional to the slip of the induction motor. Accordingly, motor torque may be thereby sensed indirectly by deriving motor torque from the direct measurement of only motor current and motor voltage.

The method includes monitoring operation of the induction motor and comparing easily-measurable parameters of the induction motor during operation with baseline (reference) characteristics of the induction motor for known normal operation. Deviations of the motor's characteristics from the known baseline indicate an actual mechanical disturbance and an approaching mechanical failure. Mechanical disturbances of the machinery are reflected in fluctuations in the load torque of the machinery. Therefore, motor torque fluctuations are analyzed to detect present mechanical disturbances that are indicative of early-stage mechanical failures in the machinery driven by the motor. Fluctuations of motor torque are analyzed by Fast Fourier Transform (FFT) analysis. A system in accordance with the present invention may operate in conjunction with a process control system that stops and starts the system apparatuses according to starts and stops of the monitored machinery and supplies the current values of process parameters. Optionally, machinery-specific characteristics may be learned by automated creation of a model correlating diagnostic parameters with machinery process parameters such as pressures, temperatures, flow rates, capacities, etc. A machinery-specific baseline (reference) profile of the monitored machinery may thereby be produced.

The present invention also provides a method for monitoring machinery for disturbances and/or failures by building and analyzing objects referred to herein as "Experimental Fractals" that reflect a current state of the monitored machinery. A current state of the machinery may be analyzed using Experimental Fractals in the coordinates rotor angle/B torque.

The state of machinery is evaluated by statistical evaluation of Experimental Fractal parameters, such as envelope parameters. Machinery failures may be diagnosed by combining evaluation of the FFT and Experimental Fractal diagnostic indicators. Experimental Fractal graphical images may be used to visually represent a machinery state.

Failure forecasting for machinery is provided by automatic modeling of a derivation trend by extrapolating the trend into the future.

DETAILED DESCRIPTION

The present invention relates to a system and method for remote detection of mechanical disturbances in machinery, such as rotary machinery, driven by an induction motor for the purpose of predicting incipient failures in the machinery. The foregoing summary, as well as the following detailed description of preferred embodiments of the invention, will be better understood when read in conjunction with the appended drawings.

Figure 1:
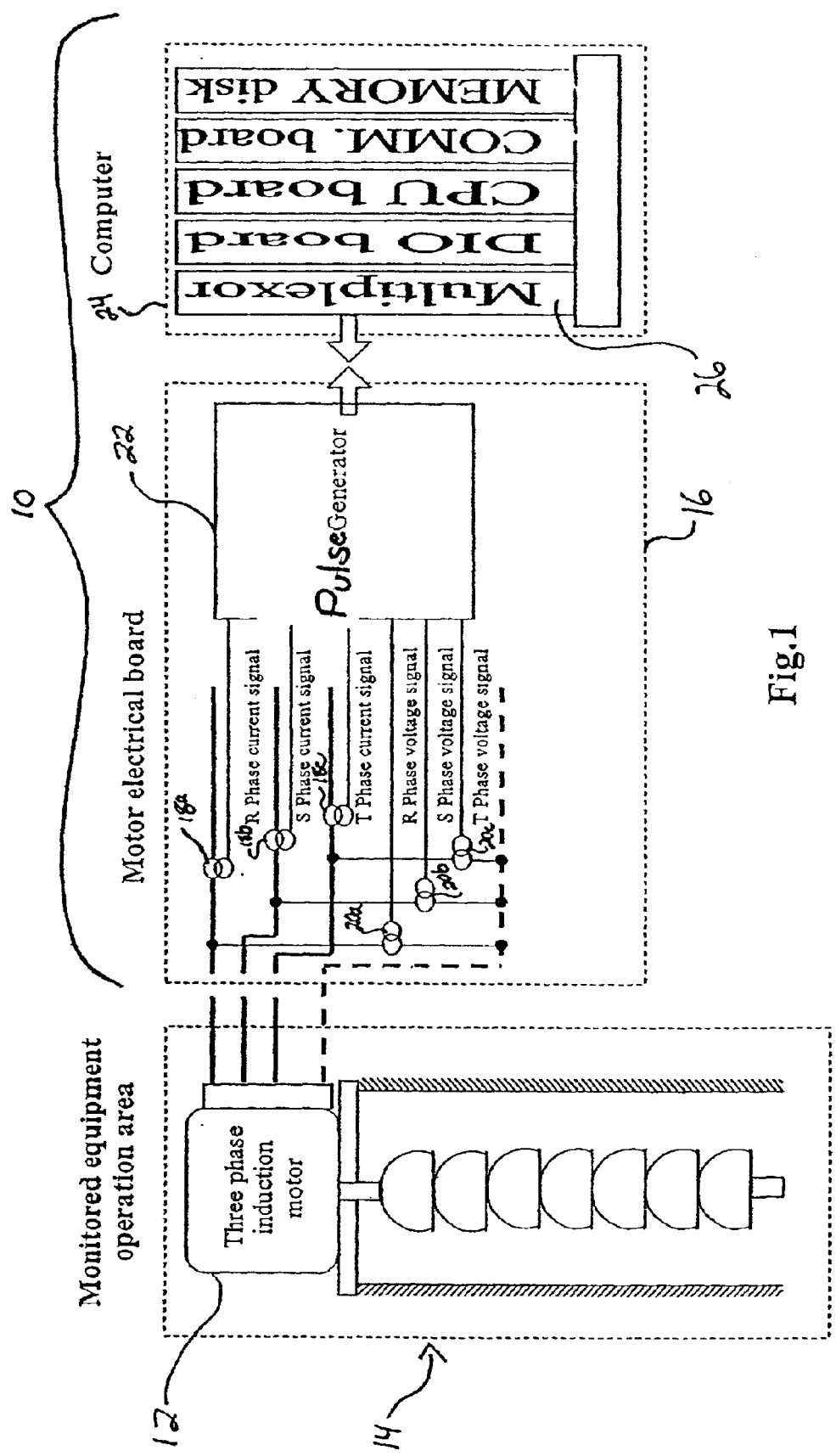
FIG. 1 shows a system in accordance with an exemplary embodiment of the present invention.

Reference is now made to FIG. 1, which illustrates an exemplary system for detecting mechanical disturbances in induction motor-driven machinery in accordance with a preferred embodiment of the present invention. The exemplary system 10 of FIG. 1 includes components for carrying out the inventive method, as discussed further below. FIG. 1 shows an exemplary three phase induction motor 12 driving a piece of the rotary machinery 14, such as a pump, compressor, mixer, mill, refrigeration/air conditioning unit, etc.

The induction motor 12 is supplied with electric power from a remote electrical board 16 of the system 10. In accordance with the present invention, a data acquisition system, that may be placed near or integrated into the electrical board 16, includes current sensors 18, voltage sensors 20, and a pulse generator apparatus 22. The current and voltage sensors may be provided for one or more phases of the induction motor 12. In the embodiment shown in FIG. 1, a current-measuring transformer 18a, 18b, 18c and a voltage-measuring transformer 20a, 20b, 20c is provided for each of the three phases (R, S and T) of the motor 12.

Pulse generator 22 is provided to transform analog signals from the current and voltage sensors 18, 20 to a time series of pulses having leading and trailing edges related to current and voltage zero crossings, i.e. changes in polarity from negative to positive. The time series of pulses is represented as a digital signal, as discussed in greater detail below with reference to FIG. 2.

Digital signals from the pulse generator 22 enter the Digital Input/Output Board 28 of a computer 24 through multiplexor 26. The operation of the pulse generator 22 is supported by signals coming from the computer 24. The computer 24 is configured for performing signal processing and may be embodied in an embedded, desktop, handheld or other commercially available general purpose computer, or any specialized device with a microprocessor, RAM and ROM memories, long term data storage such as a hard disk drive, and communication facilities such as serial and parallel ports, an Ethernet card, wireless communication card, control bus communication card, etc.

In addition to the above-described computer 24, pulse generator 22 and sensors 18, 20 for measuring current and voltage, the system 10 optionally includes mechanical sensors such as vibration, acoustical, shaft position, phase markers, etc. The details of the structure and operation of such mechanical sensors is well known in the art and is not necessary for a complete understanding of the present invention.

Figure 2:
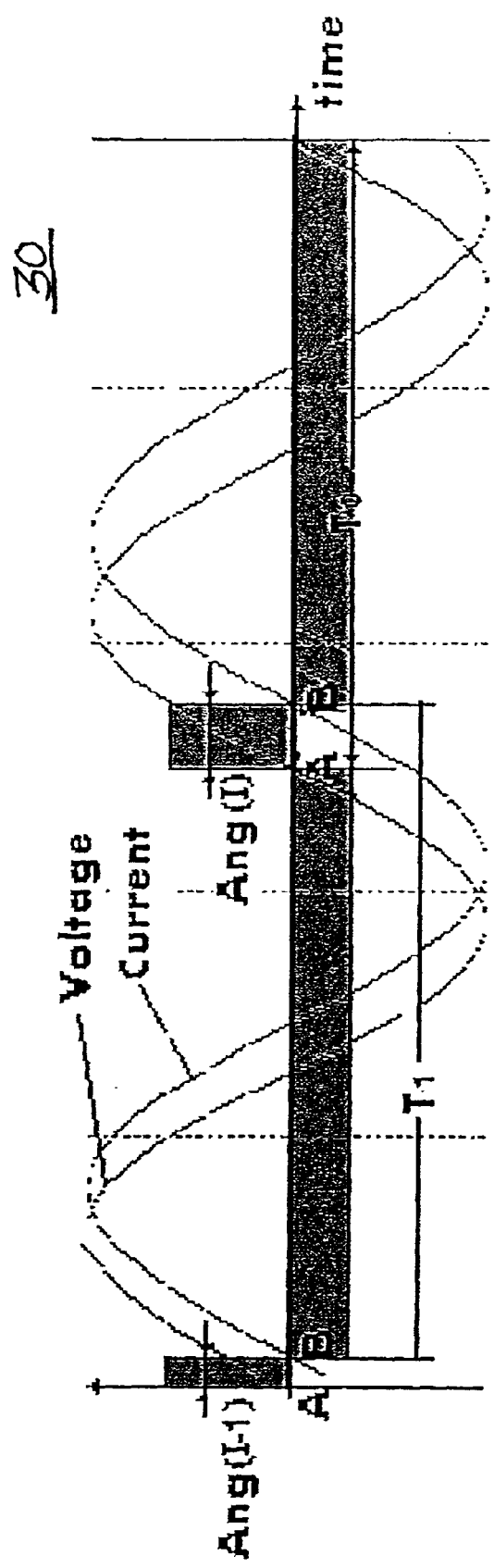
FIG. 2 shows a time diagram of a pulse generator operation.

Exemplary operation of the pulse generator 22 is illustrated by the time diagram 30 shown in FIG. 2, which illustrates the voltage and current for one phase of the induction motor 12 stator winding (not shown). In the example of FIG. 2, point A indicates the instant of voltage zero crossing related to the change in polarity from negative to positive. Point B indicates the instant of current zero crossing related to the change in polarity from negative to positive.

Accordingly, the pulse generator 22 generates two series of rectangular pulses, namely, a first series (series AB) including pulses with a leading edge at point A and a trailing edge at point B, and a second series (series BA) including pulses with a leading edge at point B and a trailing edge at point A.

Figure 3A:
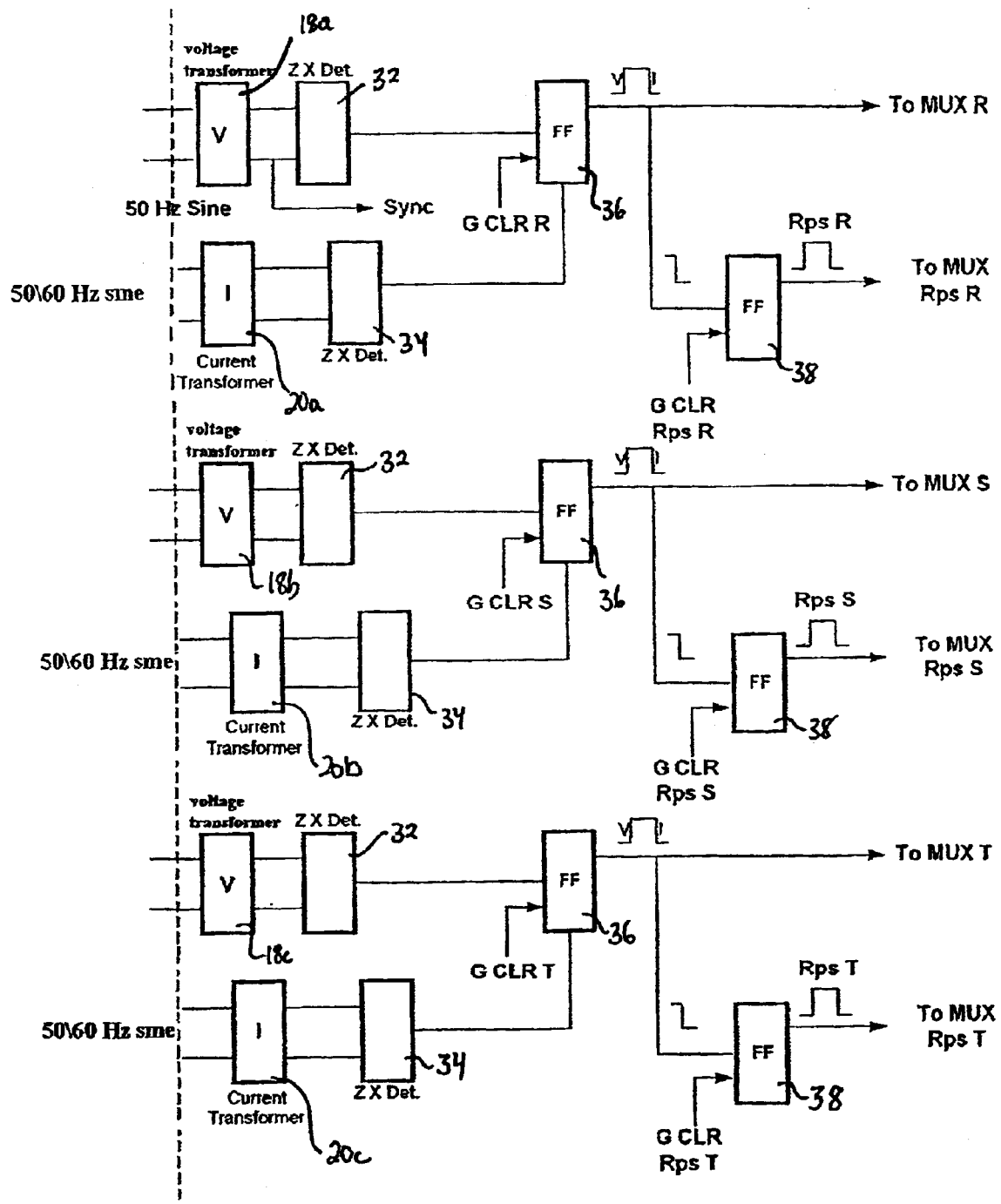
FIGS. 3A, 3B, 3C, 3D are the pulse generator block schemas.

An exemplary block schematic of the pulse generator 22 is shown in FIG. 3A, which illustrates the pulse generation and data acquisition arrangement for the three-phase induction motor of FIG. 1. As shown in FIG. 3A, analog signals from the current-measuring and voltage-measuring transformers 18, 20 are processed by zero crossing detectors 32, 34. For example, a suitable commercially available zero crossing detector is model number LM 339 manufactured by National Semiconductor. Other suitable detectors are well known in the art. Output signals from the zero crossing detectors 32, 34 enter electronic flip flop circuits 36 and 38. For example, suitable flip flop circuitry is embodied in commercially available chip model number 74LS112 manufactured by National Semiconductor. Referring now to FIGS. 2 and 3A, flip flop circuit 36 provides the rectangular pulse defined above as the AB series pulse, and flip flop circuit 38 provides the rectangular pulse defined above as the BA series pulse.

Prediction of mechanical failures in rotary machinery can be improved if diagnostic signals are associated with the angular position of a rotor of a motor. As known in the art, the mechanical rotational speed of the induction motor's rotor is a function of the electromagnetic field speed and the number of pole pairs that it has. Rotor speed can be calculated by dividing the electromagnetic field speed by the number of pole pairs, as is known in the art. Accordingly, the number of voltage zero crossings occurring during one rotor revolution is equal to the number of pole pairs ($P_0$) possessed by the motor.

To correlate the AB series pulses to rotor position it is necessary to detect a motor pole pair to which each pulse corresponds. For this purpose, a software-based pole counter is used. The pole counter's value is increased each time a voltage zero crossing occurs (from negative to positive) in one of the phases, for example phase R. Accordingly, the time series of counter values looks like: 1, 2 . . . $P_0$, 1, 2 . . . $P_0$.

The leading edges of the AB series pulses correspond to a specific value of the pole counter that serves as an indicator of a specific angular zone of rotation of the rotor.

Figure 3B:
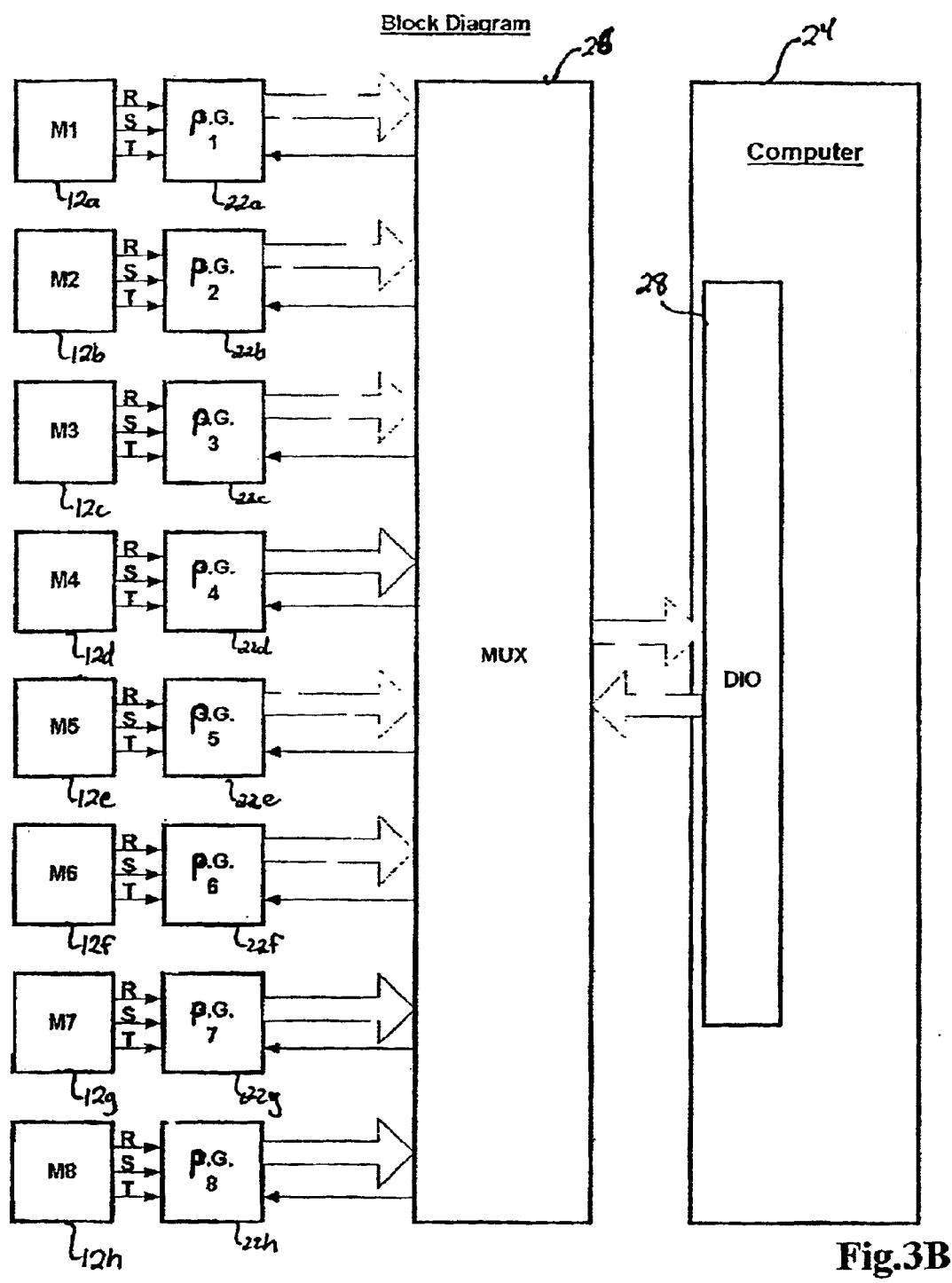
Figure 3C:
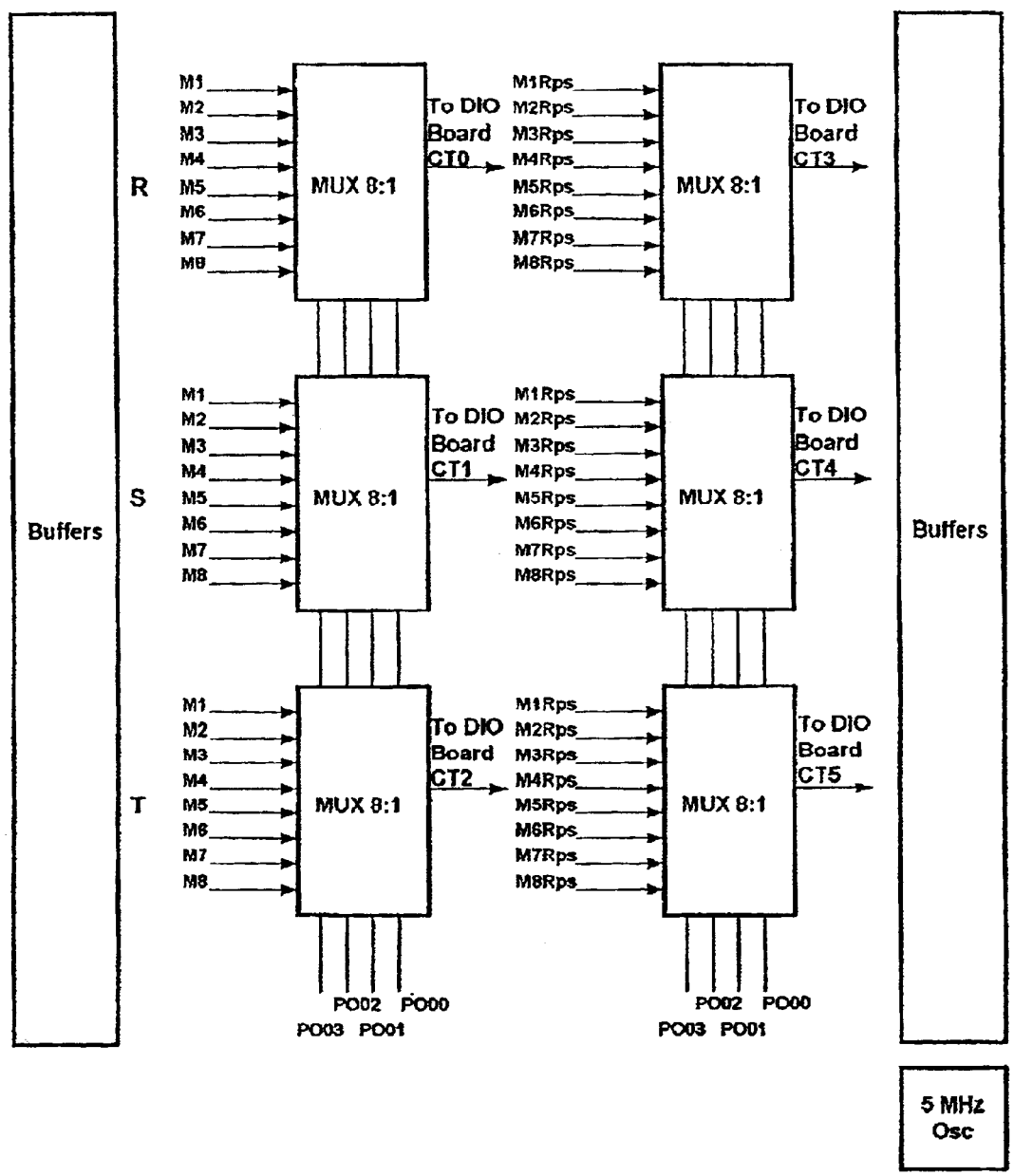

According to the present invention, a plurality of pulse generators, for example eight, 22a, 22b, 22c, 22d, 22e, 22f, 22g and 22h, can be connected to one multiplexor 26, as shown in FIG. 3B. Therefore, the inventive data acquisition system can serve a corresponding plurality of induction motors, 12a, 12b, 12c, 12d, 12e, 12f, 12g and 12h. The multiplexor 26 of FIG. 3B is based on electronic circuitry well known in the art such as, for example, the commercially available chip model number 74LS151 manufactured by National Semiconductor. The AB and BA series pulses come through a buffer, as shown in FIG. 3C, such as, for example commercially available chip model number 74LS244 manufactured by National Semiconductor, for each phase of each induction motor 12a, 12b, etc., and are switched by a corresponding circuit of the multiplexor 26. The pulse duration is obtained by an oscillator such as, for example, a 5 MHz oscillator, as shown in FIG. 3C.

Figure 3D:
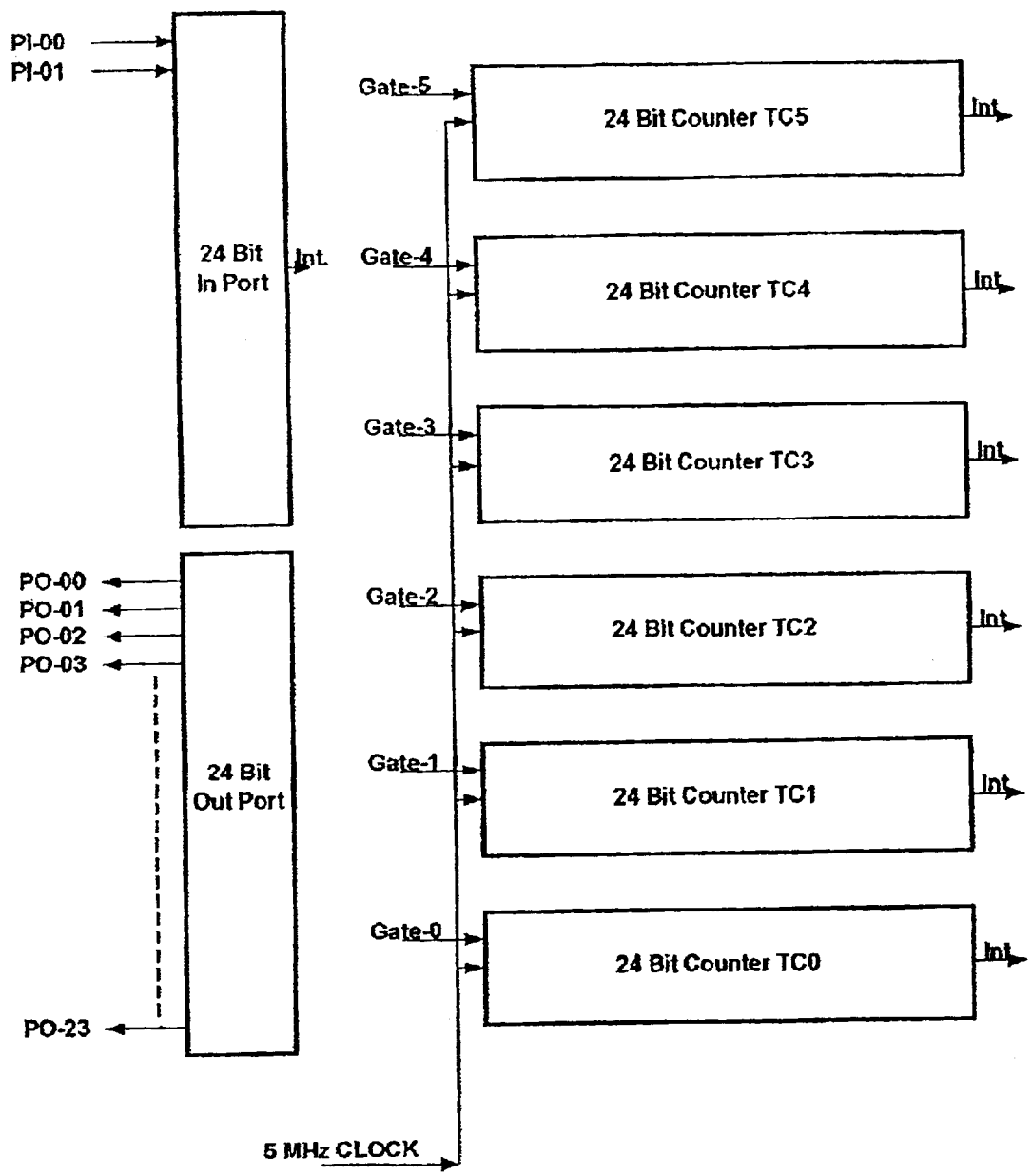

FIG. 3D shows a block schematic of an exemplary prior art Digital Input/Output 28 board of FIG. 1. A commercially available Digital Input/Output board may be used, such as Digital Input/Output board model number PCI-703 manufactured by Eagle Corporation of South Africa. This board has one 24 bit IN port and one 24 bit OUT port. The IN port receives the digital values of pulse duration. The 24 bit counters provide the values of pulse duration. The OUT port provides the pulse generators with information such as the number of pole pairs in each of the served motors, and sends reset signals. It should be noted that the disclosed functionality can be accomplished by any other suitable electronic circuitry and with other configurations of hardware components, as will be understood by those skilled in the art.

Figure 4:
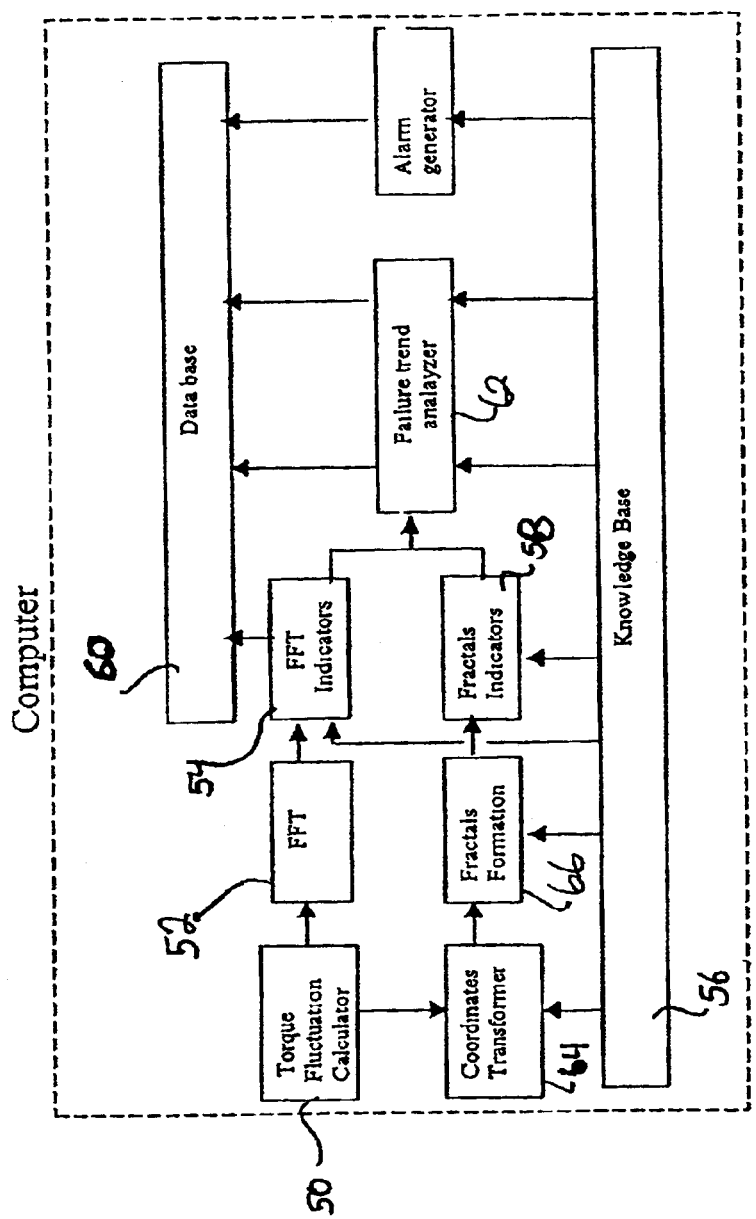
FIG. 4 is a data block diagram.

Reference is now made to FIG. 4, which shows a logic diagram of an exemplary system for detecting mechanical failures in rotary machinery driven by an induction motor by on-line processing of induction motor torque fluctuations.

In FIG. 4, blocks 50–69 represent the logical signal processing functions that are performed by the computer 24 of FIG. 1. Referring now to FIG. 4, block 50 designates the calculating means providing induction motor torque fluctuations.

The method for detecting induction motor torque fluctuations is illustrated in FIG. 2. The time interval between point A and point B of FIG. 2 is proportional to the angle between current and voltage zero crossings, which is referred to herein as phase angle. The interval A-B is constant for a given voltage supply, as a function of the voltage supply's period.

In accordance with the present invention, the phase angle time series Ang(I), namely the series AB and series BA pulses of FIG. 2, obtained as described above is used for calculation of motor slip S(I) and torque M(I).

The motor slip is derived as it follows:

$$S(I) = \frac{R2' * \text{Iim}}{(U_1 * \tan Ang(I))} = \frac{C_1}{\tan Ang(I)} \quad (1)$$

where R2' designates rotor resistance related to the stator, Iim is the reactive component of stator current, $U_1$ is phase voltage, and $C_1$ is a constant derived from nominal parameters of the induction motor. For example, such a constant may be obtained by the formula:

$$C_1 = S_{nom} * \tan(\arccos(Fi_{nom})) \quad (2)$$

where $S_{nom}$ is the nominal value of the induction motor's slip and arccos$Fi_{nom}$ is a nominal value of the induction motor's power factor, which is a known characteristic of the motor and which is typically available from the motor's manufacturer.

In the normal load range, the torque varies with the motor slip as follows:

$$M(I) = \frac{2 * S(I) * M_{\max} * (1 + S_m)}{S_m} \quad (3)$$

where $M_{max}$ represents pullout torque and $S_m$ represents B slip value related to pullout torque. $M_{max}$ and $S_m$ are constant for a specific induction motor, as is well known in the art.

Mathematically substituting expression (1) for expression (3) above, provides:

$$M(I) = \frac{2 * C_1 * M_{max} * (1 + S_m)}{(S_m * \tan Ang(I))} \quad (4)$$

or:

$$M(I) = \frac{C_2}{\tan Ang(I)} \quad (5)$$

where:

$$C_2 = \frac{2 * C1 * M_{max} * (1 + S_m)}{S_m} \quad (6)$$

Accordingly, Expression (5) provides the relationship of torque M(I) to motor phase angle Ang(I), and torque may be thereby sensed indirectly by deriving motor torque from the measurements of only motor current and motor voltage, which may be measured during operation of the motor, and with non-instrusive techniques using relatively inexpensive sensors.

Detection of mechanical disturbances in machinery may be satisfactorily achieved by obtaining torque fluctuations only; it is not necessary to obtain the absolute values of the torque fluctuations. Therefore, the method described above can be applied in accordance with the present invention without knowing the specific values of these constants, namely $S_{nom}$ and $Fi_{nom}$.

Figure 5:
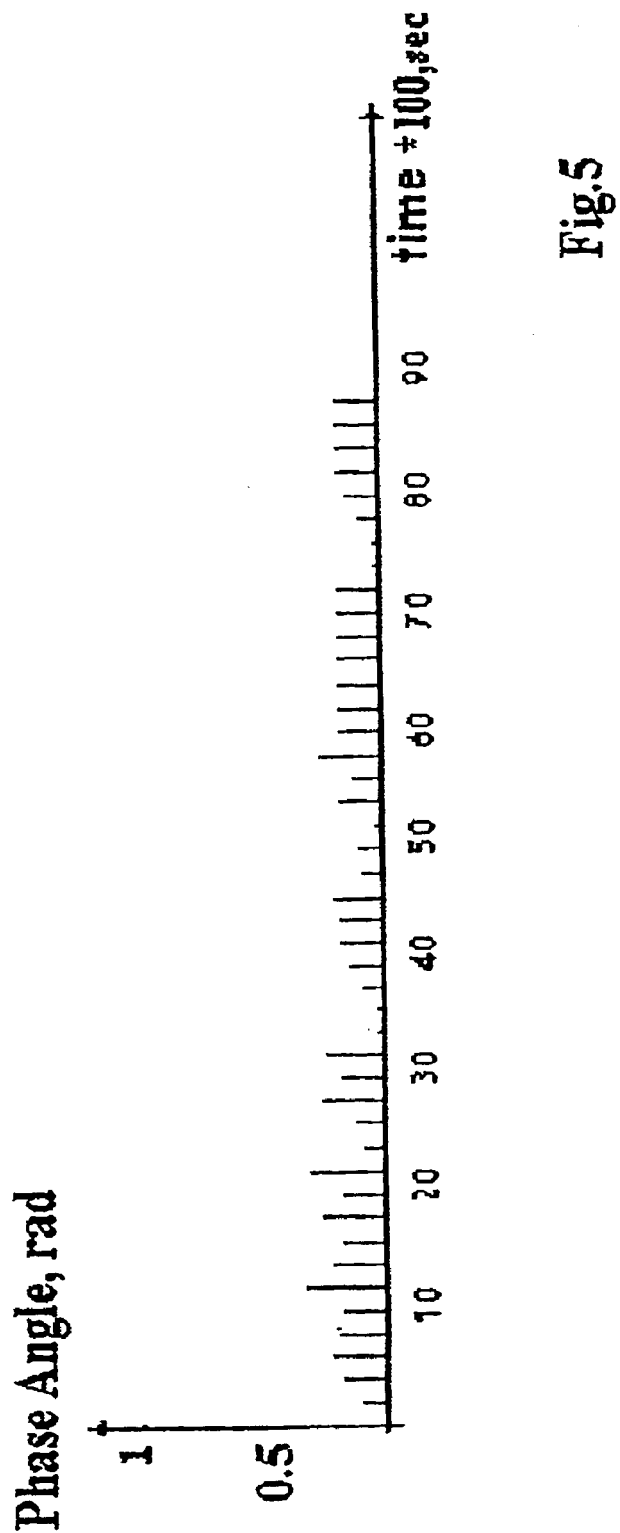
FIG. 5 shows a time series of relative phase angle.

FIG. 5 illustrates an exemplary time series of motor slip time obtained as discussed above with reference to Expressions (1)–(6). The time series illustrated in FIG. 5 is the output of block 50 of FIG. 4, and provides a motor torque spectrum.

Block 52 of FIG. 4 represents the signal processor providing the Fast Fourier Transform (FFT) of the torque fluctuations obtained by block 50. The FFT is executed on data batches. The number of elements in the batch is defined to insure the requested accuracy of the FFT. The time interval between processing of data batches selected to be suitable to the type of machinery being monitored. The same processor can serve various machines of different types. This batch processing is performed periodically, as desired.

The output of the FFT block 52, which performs an FFT analysis in a traditional manner, represents a large number of spectral amplitudes corresponding to frequencies of the motor torque spectrum frequency domain. The FFT Indicators block 54 decomposes the motor torque spectrum to select the lines that are informative, e.g. statistically significant, for a specific application.

The motor torque spectrum reflects the specific structure of monitored machinery, i.e. it provides a unique motor torque signature. For example, the motor torque spectrum of machinery having roller bearings includes lines with frequencies related to the specific number of rollers, ring diameters, etc. By way of further example, the motor torque spectrum of a motor driving a gear reflects the number of gear teeth, etc. Therefore, the automated analysis of an induction motor torque spectrum should be based on knowledge of characteristics of the particular machinery being monitored.

The inventive method for analyzing an induction motor's current spectrum uses a predetermined profile of such frequencies. This definition is prepared for the specific type of machinery. A database of informative frequencies is stored in the knowledge base (database) 56 of FIG. 4. According to the inventive method, a software module 58 is provided for automatically comparing the amplitudes of the lines associated with failures in the monitored machinery.

Figure 6:
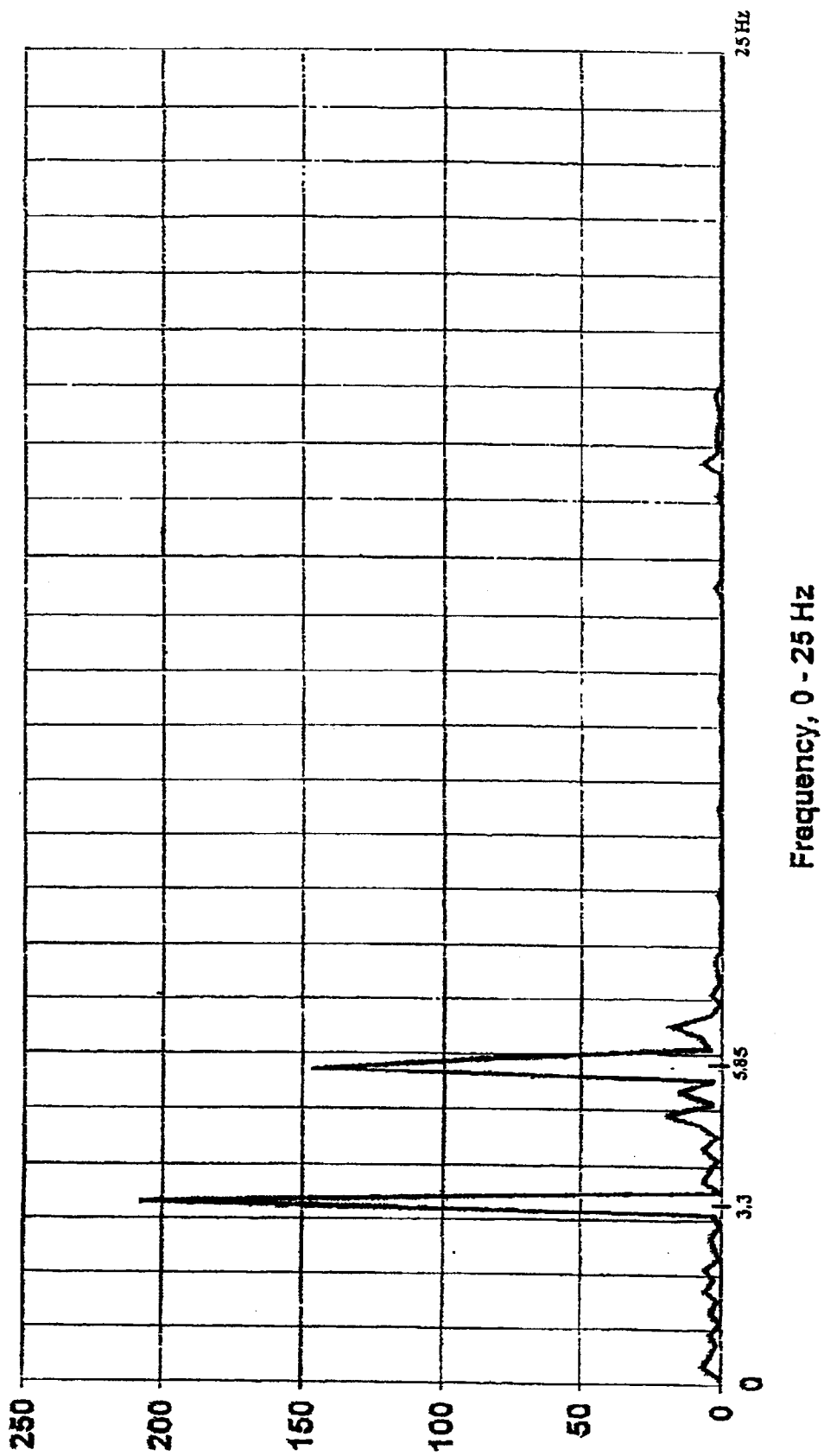
FIG. 6 is a plot in frequency versus amplitude coordinates of a motor torque spectrum for an exemplary petrochemical mixed reactor.

An exemplary torque spectrum is shown in FIG. 6, which illustrates a torque spectrum for an exemplary petrochemical rotation-based mixed reactor. The mechanical speed of this reactor is relatively uniform. The fluctuations in the torque mostly reflect the fluctuations in the friction moment of the reactor's roller bearings. Two magnitudes are prominent in the spectrum shown in FIG. 6. These magnitudes show that the most informative diagnostics indicators are the frequencies corresponding to the pronounced peaks (3.3 and 5.85 Hz). To identify the kind of mechanical failure being experienced by the reactor, relationships from rolling bearing theory can be implemented when the number of rotor shaft revolutions (RPM) is substituted for the nominal slip value in the same units (RPM) in the expression above.

For such a determination, for example, inner bearing race frequency can be calculated as:

$$BPFI = \left(\frac{N}{2} + 1.2\right) * RPM$$

In accordance with the inventive method, inner bearing race frequency can be calculated as:

$$BPFI = \left(\frac{N}{2} + 1.2\right) * slip$$

By way of example, the plot in FIG. 6 has two peak lines at frequencies of 3.3 Hz and 5.85 Hz. For the reactor of FIG. 6, the nominal slip is equal to 25 RPM or 0.417 Hz. The number of bearing rollers N=15, and thus the BPFI=3.6 Hz. This value is very close to the frequency of 3.3 Hz of FIG. 6. The second line (5.85 Hz) is associated with specific structure of the bearings and the reactor.

The side bands near these lines are associated with bearing cage frequency. The calculation of this frequency can be based on the same principle as the inner bearing race frequency calculated above. Specifically, $$FTF = \left(0.5 - \frac{1.2}{N}\right) * slip$$

For the spectrum in FIG. 6, FTF=0.17 Hz. This value is close to the side band width in FIG. 6.

Referring again to FIG. 4, Block 54 represents a software implementation for performing automatic processing of the motor torque spectrum, in accordance with the present invention, to select informative diagnostic indicators from the various of lines of frequency spectrum, e.g. by selecting those with prominent peaks of magnitude.

The method of selection of the diagnostic indicators consists of the following steps. First, an overall value of spectrum line amplitudes is calculated. For example, this may be calculated as:

$$O_v = \frac{Sum(A(I))}{n}$$

where A(I) is an amplitude of a harmonic in the frequency spectrum, and n is the number of lines in the spectrum.

Next, the spectrum line amplitude standard deviation is calculated. For example, this may be obtained as follows:

$$D = \frac{\sqrt{(\text{Sum}(A(I)B\,O_v)^2)}}{n}$$

Significant spectrum lines, i.e. those informative for diagnostic purposes, may then be detected as those having an amplitude exceeding the standard deviation. For example, spectrum lines may be selected as significant if they have amplitude greater than an overall value plus 3 measures of standard deviation. Spectrum lines with frequencies associated with machine structure are then identified, e.g. by referencing the knowledge base 56.

Spectrum lines having frequencies close to these lines (side bands) are then identified and their amplitudes are obtained. Selected spectrum lines may then be removed (or ignored) from the spectrum, as discussed in the preceding paragraphs.

The spectral moment for the remaining spectrum is then obtained. For example, this may be obtained as follows:

$$SM = \frac{\text{Sum}(F(I)*A(I))}{(F_{max} - F_{min})}$$

where $F_{max}$ is the B maximum frequency in the motor torque spectrum, and $F_{min}$ is the minimum frequency in the spectrum.

Block 60 of FIG. 4 represents a database for storage of the FFT diagnostic indicators in real time database, e.g. in the computer's long term storage, such as a hard disk.

The present invention may use a construct referred to herein as Experimental Fractals. The concept of fractals is generally known in the art. Generally speaking, a fractal may be a graphical image that illustrates a set of points corresponding to differential equation solutions over some period of time. The Experimental Fractal disclosed by the present invention is a set of points associated with data measured over a certain period of time.

For rotary machinery, the period for fractal building is associated with a number of shift revolutions. Therefore, every point of an Experimental Fractal reflects corresponding measured data for a specific value of motor shaft angle. The number of points that is added to an Experimental Fractal during one revolution is equal to the number of a pole pairs of the induction motor. The Experimental Fractal is built over a selected number of revolutions, for example 256 revolutions. For example, the Experimental Fractal may be defined as a set of points plotted on coordinates torque-rotor angle. The entity of points in these coordinates represents the distribution of the torque values versus shaft angular position.

The creation of Experimental Fractals is performed by blocks 64, 66 of FIG. 4. In accordance with the present invention, block 64 provides a transform of torque values from time to rotor angle dependent coordinates. The torque values are taken from the array shown in the plot 1, FIG. 5 and a related angle value is taken from the array shown on plot 2, FIG. 5. Therefore, every point of the Experimental Fractal reflects a torque value for a corresponding value of shaft angular position.

The Experimental Fractal angle coordinates may be obtained as follows:

$$FractalAng(I) = FractalAng(I-1) + \frac{6.28}{P_0 * (1 - S(I))} \quad (7)$$

where $P_0$ is number of pole pairs and $S(I)$ is the slip time series value from equation (1) above.

It will be noted that if FractalAng(I) is greater than or equal to 6.28 then FractalAng(I) equals FractalAng(I)−6.28.

FractalAng(I) is one of two the Experimental Fractal coordinates for the instant at angular position "I". This parameter reflects the rotor angle position. The second Experimental Fractal coordinate is the torque value M(I) from equation (5) above. Accordingly, an Experimental Fractal is a graphic image or a numerical entity in polar coordinates. Typically it is built as M(I) versus FractalAng (I). In accordance with the present invention, Experimental Fractal graphical images can serve as a visualization means helpful for visual monitoring of the state of monitored machinery as well as for automatic diagnostics.

Figure 7B:
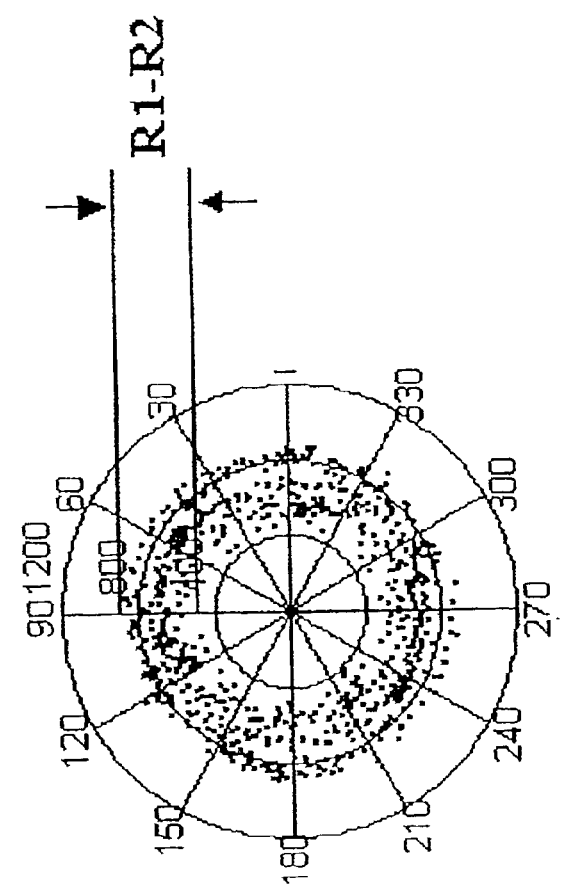
FIG. 7B is an exemplary Experimental Fractal for the vertical pump of FIG. 7A, showing improper fastening to the base.
Figure 7A:
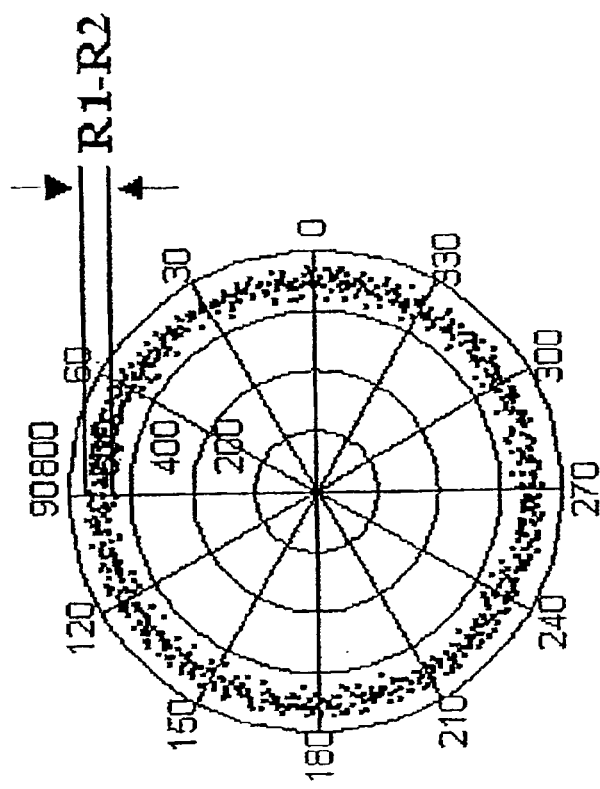
FIG. 7A is a plot of an exemplary Experimental Fractal for a vertical pump with proper fastening to a base.
Figure 8A:
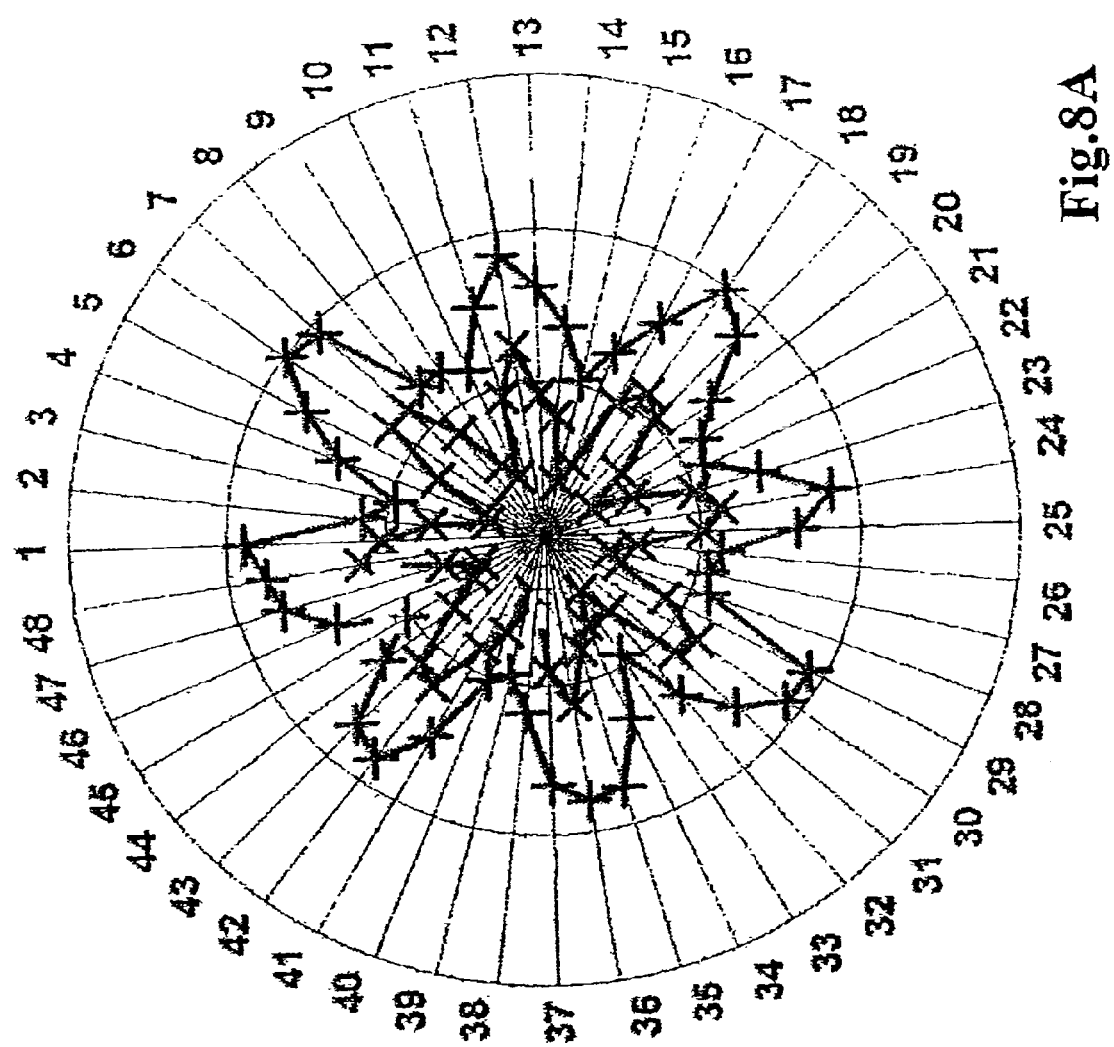
FIG. 8A shows an exemplary Experimental Fractal associated with a rolling bearing in a normal condition.
Figure 8B:
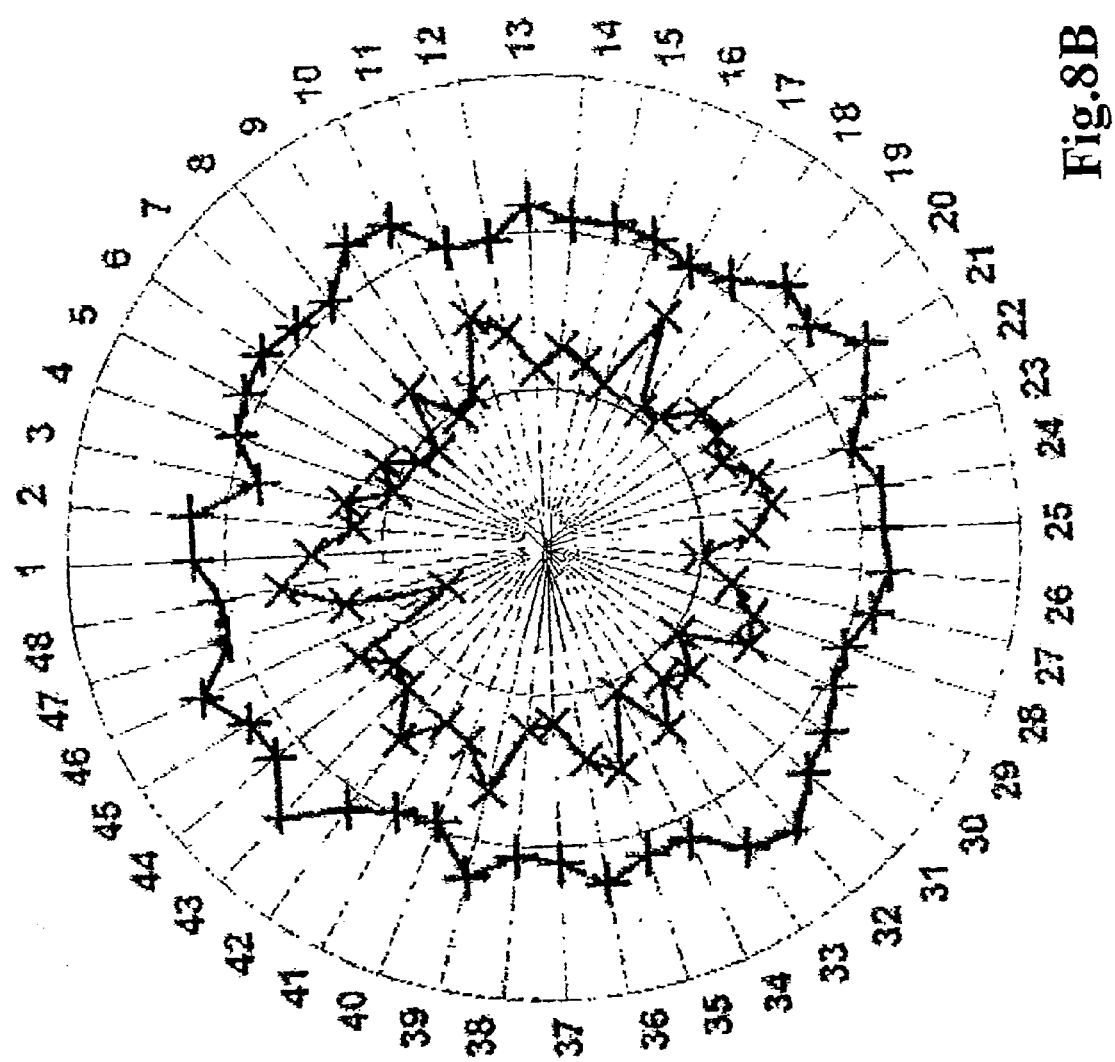
FIG. 8B shows an exemplary Experimental Fractal envelope of the rolling bearing of FIG. 8A, with the bearings in a worn condition.
Figure 9:
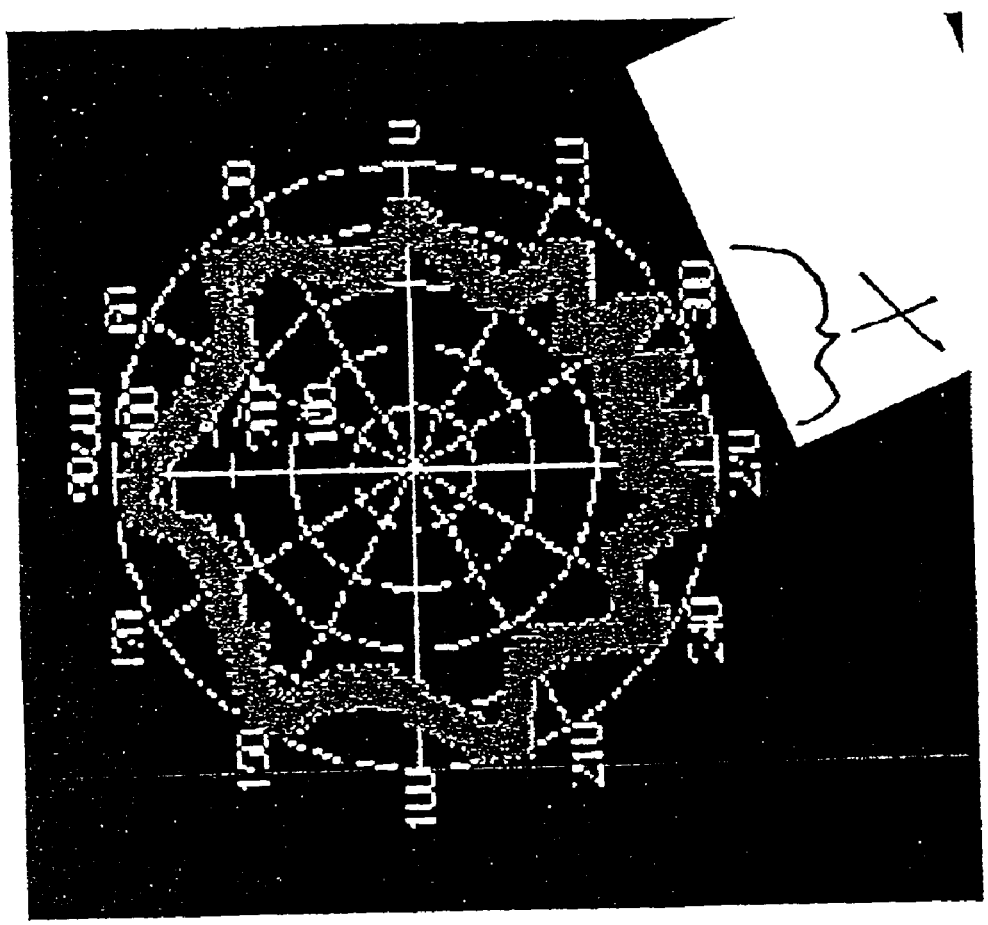
FIG. 9 illustrates an exemplary Experimental Fractal associated with a failure of a capacity control system in one cylinder of a reciprocating refrigeration compressor.
Figure 10:
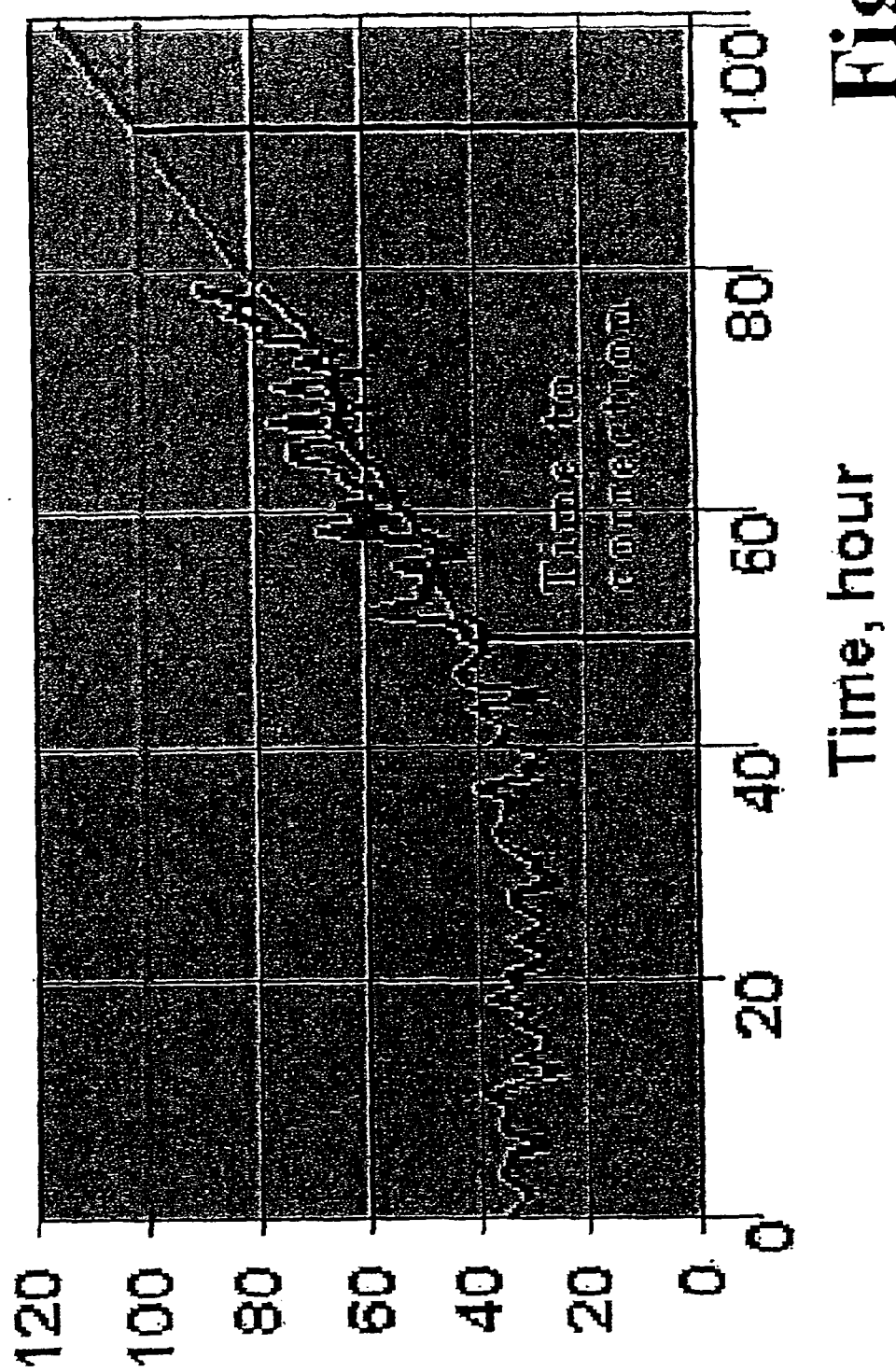
FIG. 10 shows a flow chart for failure trend analysis.

Experimental Fractals for exemplary types of rotary machinery are shown in FIGS. 7–9. The Experimental Fractals in FIGS. 7A, 7B relate to two examples of a vertical pump fastened to a base. The Experimental Fractal in FIG. 7A corresponds to normal operation of a properly fastened pump. The Experimental Fractal in FIG. 7B indicates a looseness, or improper fastening of the pump to the base, as can be observed in the irregularities of the Experimental Fractal of FIG. 7B as compared to the Experimental Fractal of FIG. 7A.

FIGS. 8A and 8B illustrate Experimental Fractal envelopes relating to different states of an exemplary stirred reactor's roller bearings. The Experimental Fractal of FIG. 8A corresponds to normal operation of the reactor when every roller is properly rotating in its bed. The Experimental Fractal of FIG. 8B shows irregularities reflecting deviations from the Experimental Fractal of FIG. 8B, and indicates a mechanical failure of the reactor, specifically, a worn bearing with rollers that are not properly fixed in their beds.

FIG. 9 shows an Experimental Fractal illustrating a mechanical failure in a cylinder of a reciprocating refrigeration compressor. The number of protuberances in the fractal image relates to the number of cylinders. The fluttering form of one of the protuberances (shown generally at X on FIG. 9) represents the improper operation of the capacity regulating mechanism in the one of cylinders.

The above-referenced examples demonstrate how Experimental Fractals can be used to visually represent the status and condition of monitored machinery, and can thereby help to identify mechanical failures. Use of Experimental Fractal graphical images makes it possible to diagnose the health of monitored machinery in a simple and relatively inexpensive way, facilitating predictive maintenance practice by identifying mechanical disturbances before mechanical failure in which the machinery may be rendered inoperable. Advantageously, the monitoring can be performed during operation of the machinery so equipment down-time can be planned, avoided and/or minimized.

In accordance with the present invention, Experimental Fractal entities are automatically processed to obtain fractal diagnostic indicators that are useful for failure monitoring and diagnostics. The fractal processing includes calculation of maximum and minimum envelope, i.e., boundary, sizes, their standard deviations, etc. These parameters serve as the fractal diagnostics indicators. For example, the difference in the inside and outside envelope diameters in the Experimental Fractals shown in FIGS. 7A, 7B shows the degradation due to this specific failure.

The time dependent values of Experimental Fractal indicators are stored in real time in a database, block 60 of FIG. 4.

Block 62 of FIG. 4 relates to the failure monitoring technique and provides automated failure trend analysis. The FFT and Experimental Fractal diagnostic parameters depend not only on machinery conditions but also on operation parameters. For example, increasing the number of revolutions or process pressures, temperatures, etc. influences the magnitude and frequencies of the FFT spectrum lines and the Experimental Fractal envelope parameters. Therefore, to detect incipient failures and present disturbances, it may be advantageous to reduce or eliminate the influence of process parameters.

Figure 11:
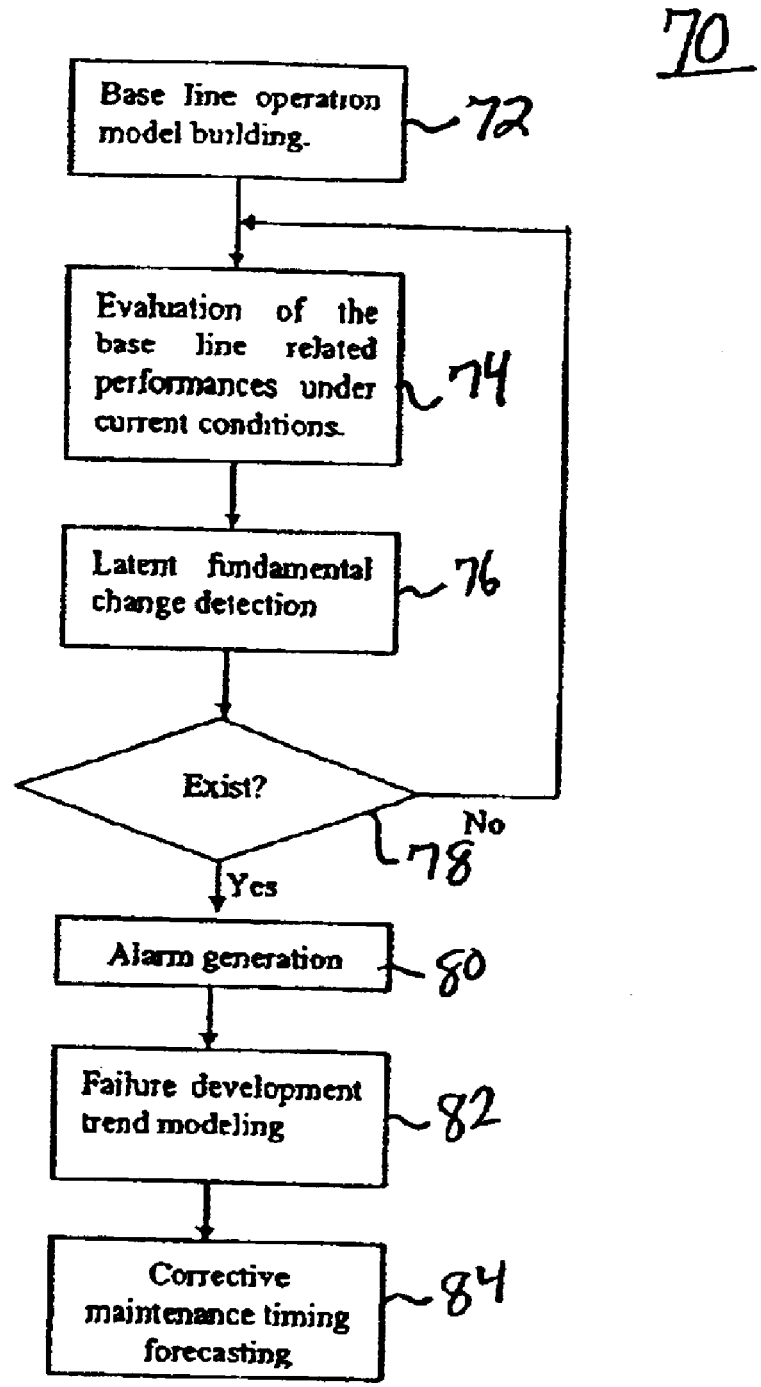
FIG. 11 illustrates an example of trend analysis with forecasting of future failure development.

An exemplary flow chart 70 of a failure trend analysis process is shown in FIG. 11. As shown in FIG. 11, the process of failure trend analysis may be accomplished as follows. First, a baseline operation model is built to reflect normal operation, as shown at step 72. In this step, a statistical model of the machine is created in the baseline condition, that is, normal machine state conditions. The model may be built by methods well known in the art, such as Back Propagation Artificial Neural Network (ANN). For machinery model building, various commercially available software packages may be used. In accordance with the present invention, machine performance parameters such as the number of revolutions, process pressures and temperatures, machine capacity, etc. can be used. The specific set of ANN inputs depends on the type of monitored machinery, as will be appreciated by those skilled in the art. Preferably, recommended input sets may defined initially by a system integrator and be stored in the system's database 60, shown in FIG. 4.

As ANN outputs, the time series of the FFT and Experimental Fractal diagnostic parameters in the initial mode of system operation, considered here as baseline parameters, are used. As a result of the ANN training, a statistical model providing correlation between machine process parameters (ANN inputs) and diagnostic parameters is obtained. The correlation coefficients (ANN weights) are preferably stored by in the system database 60 of FIG. 4.

Next, current machinery performance is evaluated while the machinery is on-line, i.e. operating, as shown at step 74. The same ANN monitoring is run during operation. The machinery's health is checked (i.e. to detect mechanical failures) as disclosed by the present invention by calculating the Euclidean distance between the vector of ANN weights obtained in the baseline condition training and the vector of ANN weights obtained during system operation. By way of example, Euclidean distance may be calculated as:

$$D(I)=\sqrt{(B(I)-A)^2}$$

where A is an ANN weight vector obtained by training under baseline conditions, B(I) is an operating ANN weight vector for moment of time "I," and D(i) is a Euclidean distance between two vectors for moment of time "I."

The time series of the D(I) values is continuous analyzed, as shown at steps 76 and 78 of FIG. 11. For example, the forecasted value of Euclidean distances FD(I) for next time step may be calculated as:

$$FD(I)=FD(I-1)+DER(I-1)$$

where DER(I−1)=(D(I−1)−FD(I−1))*TimeConst, and Time-Const is a constant, usually equal to approximately 0.2.

The mean value of DER(I), referred to as MeanDER(I), is next calculated for the "K" last time moments as follows:

$$MeanDER(I) = \frac{SUM(DER(I-K)+DER(I-K+1)+\ldots+DER(I))}{K}$$

The situation defined as Abs(MeanDER(I))>Threshold is considered a disruption situation associated with beginning of mechanical failure, which is used to determined whether a failure exists in step 78. When a failure is detected, the related alarm is generated, as shown at step 80.

Failure development trend modeling is then performed, as shown at step 82. The forecasted Euclidean distance values for "K" next time steps may be calculated as:

$$NextKStepsForecast=FD(I)+K*MeanDER(I)$$

Extrapolation of this model to provide future data points allows forecasting of an expected time of mechanical failure. This is used for corrective maintenance timing forecasting, as shown at step 84. A threshold level may be predetermined to reflect a tolerance for deviations such that the situation defined as NextKStepsForecast>Threshold is considered as a dangerous situation in which mechanical failure is likely. This allows for prediction of a time of machinery failure.

The expected time to the dangerous situation can be calculated as:

$$\frac{(Threshold-FD(I))}{MeanDER(I)*UpdateTime}$$

where, UpdateTime is a time increment between two evaluations of failure status.

In this way, the motor's torque fluctuations are used as an indicator of early-stage mechanical failures in the machinery for predictive maintenance purposes, to avoid machinery inoperability.

What is claimed is:

1. A system for detecting mechanical disturbances in machinery driven by an induction motor, said system comprising:

a current sensor monitoring current in at least one phase of the motor and transmitting a corresponding current signal;

a voltage sensor monitoring voltage in said phase of the motor and transmitting a corresponding voltage signal;

a pulse generator receiving said current and voltage signals and transmitting a pulsed signal comprising a plurality of pulses, each pulse being generated once per voltage period and having a leading edge corresponding to a time of the voltage signal's change in polarity and a trailing edge corresponding to a time of the current signal's corresponding change in polarity; and a processor obtaining a first data series including durations of the pulses, and a second data series including times between a respective trailing edge of a first pulse and a respective leading edge of a next sequential pulse, said processor computing phase angle as a value proportional to pulse duration, said processor further computing torque as a value proportional to phase angle, wherein said processor repeatedly computes phase angle and torque over time, and wherein said processor identifies mechanical disturbances in the machinery as a function of fluctuations in computed phase angle and torque values over time.

2. The system of claim 1, wherein said processor correlates motor torque with angular position of a rotor of the motor.

3. The system of claim 2, said processor further comprises:
a slip subprocessor for determining motor slip as a function of said current and voltage signals and said angular position of said rotor.

4. The system of claim 1, said processor further comprising:
a transformation processor for identifying informative frequencies of a motor torque spectrum representing motor torque.

5. The system of claim 1, said system further comprising:
a database storing a reference profile of motor torque for the machinery during normal operation;
a failure subprocessor for comparing said motor torque during operation to said reference profile of motor torque stored in said database to detect possible failures; and
an alarm generator for issuing an alarm if a possible failure is detected.

6. A system for detecting mechanical disturbances in machinery driven by an induction motor, said system comprising:
a current sensor monitoring current in at least one phase of the motor and transmitting a corresponding current signal;
a voltage sensor monitoring voltage in said chase of the motor and transmitting a corresponding voltage signal;
a pulse generator receiving said current and voltage signals and transmitting a pulsed signal comprising pulses having leading and trailing edges corresponding to changes in polarity of said current and voltage signals;
a processor receiving and processing said pulsed signal to determine motor torque;
a coordinates subprocessor for transforming motor torque values from time to rotor-angle-dependent coordinates; and
a fractal generator for displaying motor torque values in rotor angle dependent coordinates obtained from said coordinates subprocessor.

7. A method for detecting mechanical disturbances in machinery driven by an induction motor, said method comprising:
monitoring torque of the motor during operation of the machinery;
developing an operating profile of motor torque reflecting motor torque during operation of the machinery;
comparing the operating profile to a reference profile of motor torque reflecting motor torque during normal operation of the machinery to identify a deviation, said comparing comprising electronic signal processing of motor torque in relation to a phase angle of the motor, said electronic signal processing comprising performing a Fast Fourier Transform analysis of a phase angle time series and decomposing the motor torque frequency spectrum to identify diagnostically informative spectrum components; and
signaling a mechanical failure of the machinery responsive to identification of said deviation.

8. The method of claim 7, wherein said monitoring step comprises:
sensing current for a phase of the motor; and
sensing voltage for said phase of the motor.

9. The method of claim 8, wherein said developing step comprises:
generating a time series of pulses having a leading edge corresponding to a time of change in voltage polarity and a trailing edge corresponding to a time of change in current polarity;
determining a duration of said pulses;
determining a length of time between leading edges of two sequential pulses;
determining motor slip as a function of said duration and said length of time; and
determining motor torque as a function of said motor slip.

10. The method of claim 9, further comprising the step of:
correlating, over time, motor torque to an angular position of a rotor of said motor.

11. The method of claim 7, wherein said motor torque is correlated, over time, to an angular position of a rotor of said motor.

12. The method of claim 7, wherein said comparing step comprises:
creating an experimental fractal representing a current state of the monitored machinery.

13. The method of claim 12, said experimental fractal relates the current state of the monitored machinery in the coordinates rotor angle/B torque.

14. The method of claim 13, further comprising displaying said experimental fractal to permit a visual analysis.

15. The method of claim 13, said comparing step further comprising:
performing a statistical analysis of experimental fractal parameters to identify statistically significant deviations from a baseline profile.

16. The method of claim 7, wherein the comparing step comprises evaluating Fast Fourier Transform and experimental fractal diagnostic indicators.

17. The method of claim 7, further comprising:
operating the machinery in a normal operation condition;
developing a reference profile of motor torque reflecting motor torque during normal operation of the machinery; and
storing the reference profile.

18. The method of claim 17, wherein said reference profile is a statistical model correlating Fast Fourier Transform motor spectrum diagnostic parameters and experimental fractals parameters with machine process parameters.

19. The method of claim 7, further comprising:
forecasting a time when corrective maintenance action should be provided to avoid mechanical failure.

20. The method of claim 7, wherein a deviation is identified between historical and current values of diagnostic parameters.

21. The method of claim 7, further comprising:
trending a Euclidean distance between a vector of statistical model parameters for normal operation and the vector of statistical model parameters for current operation.

22. The method of claim 21, wherein corrective maintenance timing is made by extrapolation into the future of the Euclidean distances.

23. A method for detecting mechanical failures in machinery driven by an induction motor, said method comprising:
determining motor torque for a plurality of angular positions of a rotor;
creating an experimental fractal representing a current state of the monitored machinery, said experimental fractal relating a plurality of torque values to said plurality of angular positions of said rotor; and displaying said experimental fractal to permit a visual analysis.

24. The method of claim 23, wherein said determining step comprises:

sensing current for a phase of the motor;

sensing voltage for said phase of the motor;

generating a time series of pulses having a leading edge corresponding to a time of change in voltage polarity and a trailing edge corresponding to a time of change in current polarity;

determining a duration of said pulses;

determining a length of time between leading edges of two sequential pulses; and determining motor slip as a function of said duration and said length of time.

25. The system of claim 1, said system further comprising an induction motor pole counter that is increased in value when a voltage zero crossing occurs in one of the phases, and is reset to a zero value when a certain number of poles of the motor is counted.

26. The system of claim 1, wherein said processor uses the first and second data series to correct corresponding calculated phase angle values according to changes in frequency of a the motor's voltage supply.

27. The system of claim 1, said system further comprising an induction motor pole counter that is increased in value when a voltage zero crossing occurs in one of the phases, and is reset to a zero value when a certain number of poles of the motor is counted, wherein said processor repeatedly uses the induction motor pole counter to start obtaining the first and second data series from the pulse generator from an identical angular position of a rotor of the induction motor.

28. A method for detecting mechanical disturbances in machinery driven by an induction motor, said method comprising:

monitoring torque of the motor during operation of the machinery;

developing an operating profile of motor torque reflecting motor torque during operation of the machinery;

comparing the operating profile to a reference profile of motor torque reflecting motor torque during normal operation of the machinery to identify a deviation, said comparing comprising evaluating Fast Fourier Transform and experimental fractal diagnostic indicators; and signaling a mechanical failure of the machinery responsive to identification of said deviation.

* * * * *